US011361100B1

(12) United States Patent
Gates et al.

(10) Patent No.: US 11,361,100 B1
(45) Date of Patent: Jun. 14, 2022

(54) SYSTEMS AND METHODS FOR DETECTING POTENTIALLY MALICIOUS CONTENT IN DECENTRALIZED MACHINE-LEARNING MODEL UPDATES

(71) Applicant: Symantec Corporation, Mountain View, CA (US)

(72) Inventors: Christopher Gates, Culver City, CA (US); Yufei Han, Antibes (FR)

(73) Assignee: NortonLifeLock Inc., Tempe, AZ (US)

( * ) Notice: Subject to any disclaimer, the term of this patent is extended or adjusted under 35 U.S.C. 154(b) by 708 days.

(21) Appl. No.: 16/368,623

(22) Filed: Mar. 28, 2019

(51) Int. Cl.
*G06N 20/00* (2019.01)
*G06F 21/62* (2013.01)
*G06F 9/54* (2006.01)
*G06N 5/04* (2006.01)

(52) U.S. Cl.
CPC .......... *G06F 21/6236* (2013.01); *G06F 9/546* (2013.01); *G06N 5/043* (2013.01); *G06N 20/00* (2019.01)

(58) Field of Classification Search
CPC ........ G06F 21/64; G06F 21/645; G06F 21/50; G06F 21/52; G06F 21/554; G06F 21/566; G06N 20/00; G06N 3/08; H04L 63/12; H04L 63/14; H04L 63/20
See application file for complete search history.

(56) References Cited

U.S. PATENT DOCUMENTS

| 11,188,789 B2 * | 11/2021 | Chen | G06N 3/084 |
| 2020/0167471 A1 * | 5/2020 | Rouhani | G06N 7/005 |

OTHER PUBLICATIONS

Koh et al., "Understanding Black-box Predictions via Influence Functions", Jul. 10, 2017, 11 pages.

* cited by examiner

*Primary Examiner* — Olugbenga O Idowu
(74) *Attorney, Agent, or Firm* — FisherBroyles, LLP

(57) ABSTRACT

The disclosed computer-implemented method for detecting potentially malicious content in decentralized machine-learning model updates may include (i) receiving messages communicated within a group of client devices for performing an update of a shared machine-learning model, (ii) determining a bias of a target message in the messages communicated from a target client device in the group with respect to a remaining number of the messages in the messages communicated from the other client devices in the group, (iii) assigning a confidence score to each of the other client devices based on the bias determined for the target message, the confidence score representing a likelihood of potentially malicious content in the target message, and (iv) performing, based on the confidence score, a security action that prevents the potentially malicious content from compromising the update of the shared machine-learning model. Various other methods, systems, and computer-readable media are also disclosed.

20 Claims, 7 Drawing Sheets

SYSTEMS AND METHODS FOR DETECTING POTENTIALLY MALICIOUS CONTENT IN DECENTRALIZED MACHINE-LEARNING MODEL UPDATES

BACKGROUND

Enterprise and consumer cloud computing networks are increasingly at risk of being victimized by decentralized or federated attacks on the training of machine-learning models including poisoned data attacks and noisy or mislabeled training data. Often, these attacks are the result of different endpoints/nodes all contributing data to train a single global machine-learning model.

Traditional security solutions for protecting against attacks on the training of machine-learning models are typically configured for centralized setting models where all of the data is directly received and validated from a single source. Thus, even if all of the data is not trusted, since all of it received, the ability to inspect the data when needed is available. However, these traditional solutions are ineffective in decentralized/federated settings due to the inability to perform data inspection on all of the data from a single source.

SUMMARY

As will be described in greater detail below, the present disclosure describes various systems and methods for detecting potentially malicious content in decentralized machine-learning model updates.

In one example, a method for detecting potentially malicious content in decentralized machine-learning model updates may include (i) receiving, by one or more computing devices, a group of messages communicated within a group of client devices for performing an update of a shared machine-learning model, (ii) determining, by the one or more computing devices, a bias of a target message in the group of messages communicated from a target client device in the group with respect to a remaining number of the messages in the group of messages communicated from the other client devices in the group, (iii) assigning, by the one or more computing devices, a confidence score to each of the other client devices based on the bias determined for the target message, the confidence score representing a likelihood of potentially malicious content in the target message, and (iv) performing, by the one or more computing devices and based on the confidence score, a security action that prevents the potentially malicious content from compromising the update of the shared machine-learning model.

In some examples, the method may further include (i) receiving a group of new messages for performing the update of the shared machine-learning model from additional client devices outside of the group of the client devices, (ii) assigning a weight to the additional client devices, and (iii) minimizing, based on the assigned weight, an influence of the new messages communicated from the additional client devices when performing the update of the shared machine-learning model. In some examples, the group of messages communicated within the group of client devices and the new messages communicated from the additional client devices may be combined into the shared-machine learning model over several iterations.

In some embodiments, the additional client devices may have a trusted relationship level with the group of the client devices. In some examples, a pre-determined trust relationship level shared by the group of the client devices may exceed the trusted relationship level of the additional client devices. In some examples, the additional client devices may lack a trusted relationship with the group of the client devices.

In some embodiments, determining the bias of the target message may include (i) calculating a ratio of a group of message variables associated with the messages communicated from the other client devices and a group of message variables associated with the target message communicated from the target client device and (ii) determining the bias of the target message based on a size of the calculated ratio.

In some examples, assigning the confidence score may include (i) determining, based on the bias, that the target message represents a large deviation from at least one of (a) the remaining number of messages or (b) the shared machine-learning model, and (ii) assigning a value to the other client devices indicating a high likelihood of the potentially malicious content in the target message. In some embodiments, assigning the confidence score may include (i) determining, based on the bias, that the target message represents a small deviation from at least one of (a) the remaining number of messages or (b) the shared machine-learning model and (ii) assigning a value to the other client devices indicating a low likelihood of the potentially malicious content in the target message. In some examples, assigning the confidence score may include updating a previously determined confidence score for each of the other client devices based on the bias determined for the target message. In some embodiments, each of the client devices in the group may share a learned or a pre-defined trust relationship and based on these trust relationships, each of the client devices may learn a custom (e.g., different) machine-learning model. In some embodiments, the security action may include minimizing an impact of the potentially malicious content by filtering the potentially malicious content from the update of the shared machine-learning model.

In one embodiment, a system for detecting potentially malicious content in decentralized machine-learning model updates may include at least one physical processor and physical memory comprising a plurality of modules and computer-executable instructions that, when executed by the physical processor, cause the physical processor to (i) receive, by a receiving module, a group of messages communicated within a group of client devices for performing an update of a shared machine-learning model, (ii) determine, by a determining module, a bias of a target message in the group of messages communicated from a target client device in the group with respect to a remaining number of the messages in the group of messages communicated from the other client devices in the group, (iii) assign, by an assignment module, a confidence score to each of the other client devices based on the bias determined for the target message, the confidence score representing a likelihood of potentially malicious content in the target message, and (iv) perform, by a security module and based on the confidence score, a security action that prevents the potentially malicious content from compromising the update of the shared machine-learning model.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a group of messages communicated within a group of client devices for performing an update of a shared machine-learning model, (ii) determine a bias of a target message in the group of messages communicated from a target client device in the group with respect to a remaining number of the messages in the group of messages communicated from the other client devices in the group, (iii) assign a confidence score to each of the other client devices based on the bias determined for the target message, the confidence score representing a likelihood of potentially malicious content in the target message, and (iv) perform, based on the confidence score, a security action that prevents the potentially malicious content from compromising the update of the shared machine-learning model.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
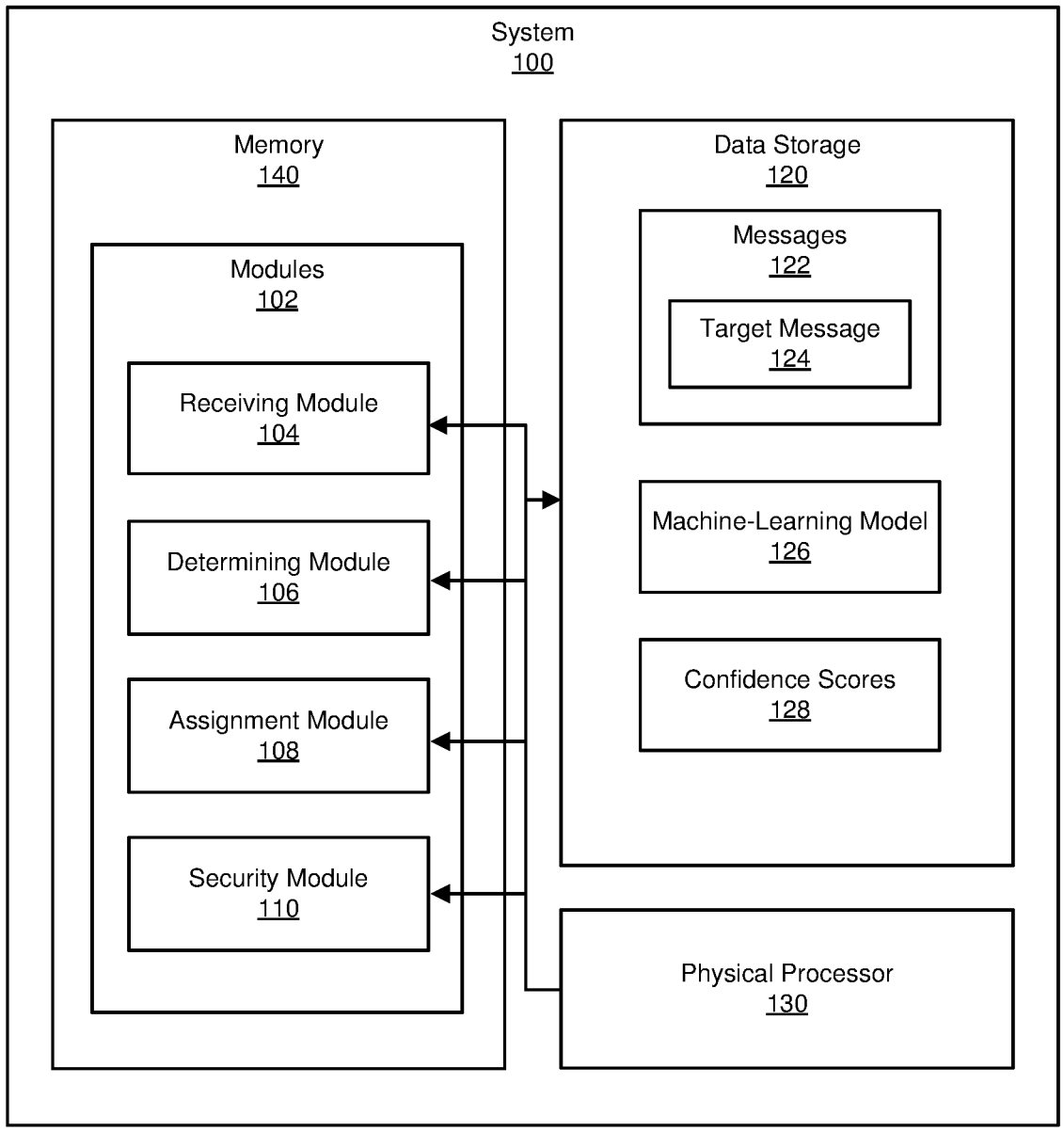
FIG. 1 is a block diagram of an example system for detecting potentially malicious content in decentralized machine-learning model updates.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting potentially malicious content in decentralized machine-learning model updates.

As will be described in greater detail below, by determining a bias of messages communicated from a group of federated clients for updating a shared federated machine-learning model, the systems and methods described herein may enable the detection of messages containing potentially malicious content. By detecting the bias in this way, the systems and methods described herein may identify a federated client device in the group responsible for sending the potentially malicious content and thereby reduce the risk of poisoned data being received by the federated machine-learning model. In addition, the systems and methods described herein may improve the security of computing devices in a network by protecting against poisoned data attacks on shared machine-learning models by decentralized federated client devices in a network.

Figure 2:
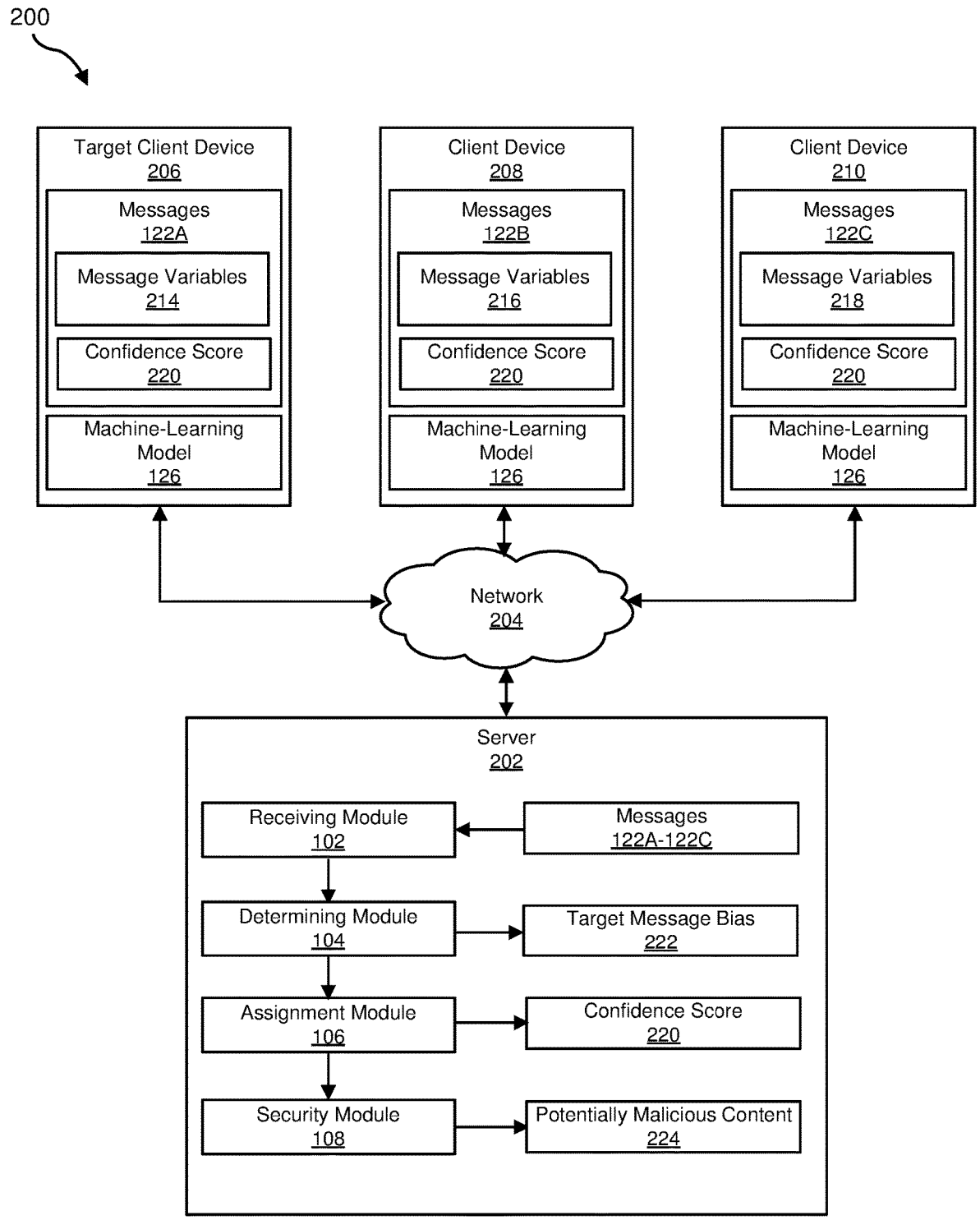
FIG. 2 is a block diagram of an additional example system for detecting potentially malicious content in decentralized machine-learning model updates.
Figure 3:
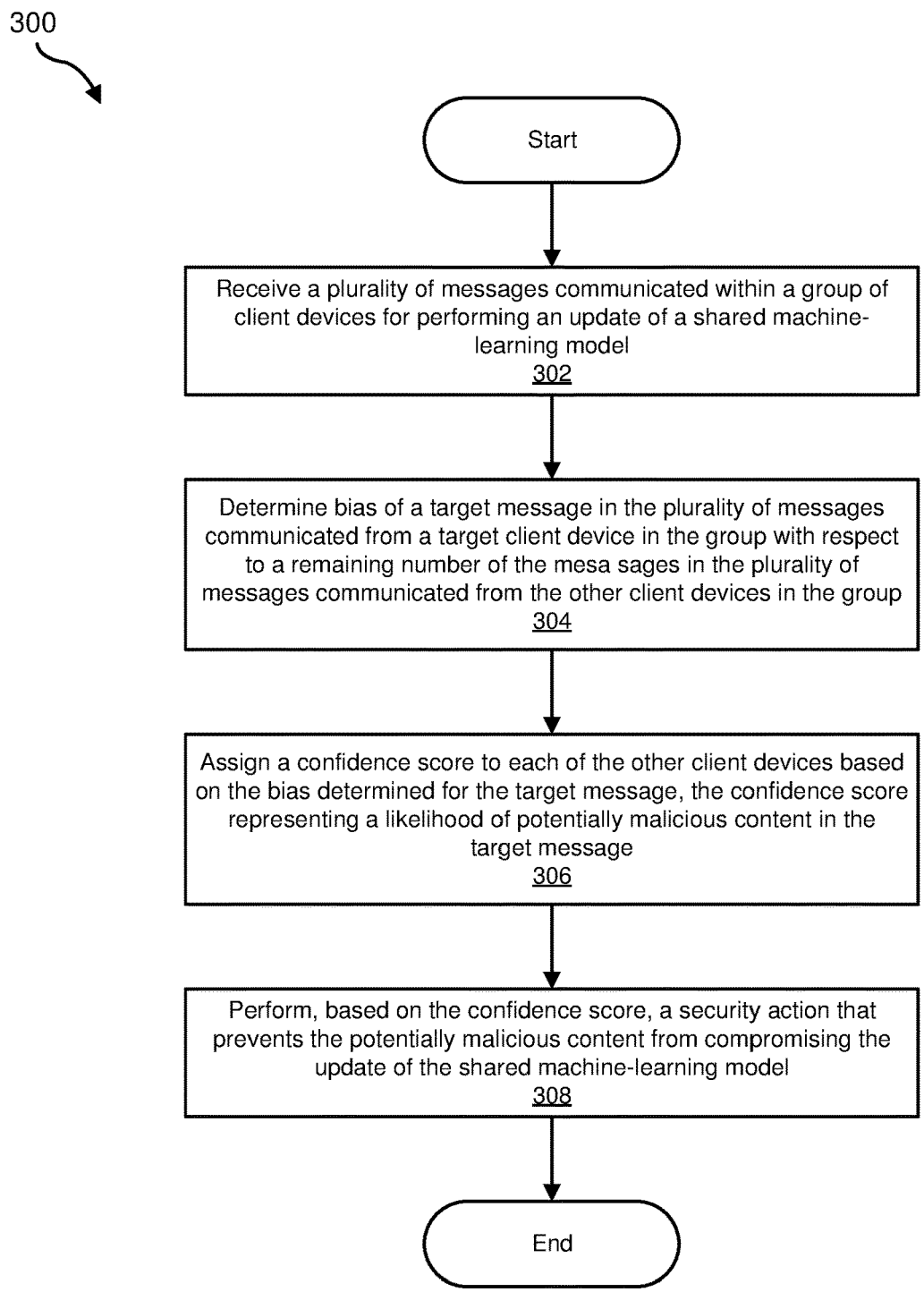
FIG. 3 is a flow diagram of an example method for detecting potentially malicious content in decentralized machine-learning model updates.
Figure 4:
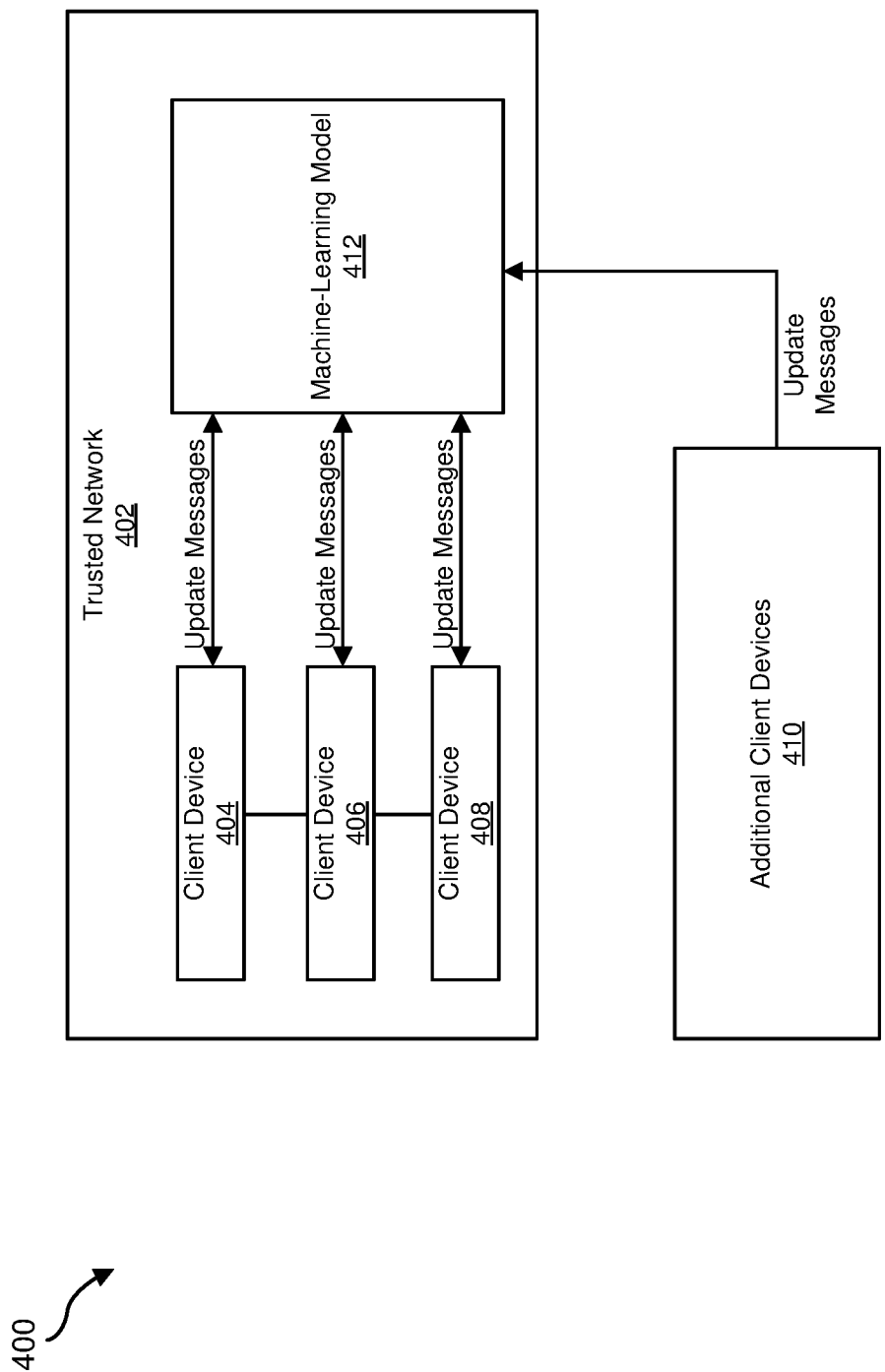
FIG. 4 is a block diagram of another example system for detecting potentially malicious content in decentralized machine-learning model updates.

The following will provide, with reference to FIGS. 1-2, and 4, detailed descriptions of example systems for detecting potentially malicious content in decentralized machine-learning model updates. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting potentially malicious content in decentralized machine-learning model updates. As illustrated in this figure, example system 100 may include one or more modules 102 for performing one or more tasks. As will be explained in greater detail below, modules 102 may include a receiving module 104 that receives a plurality of messages communicated within a group of client devices for performing an update of a shared machine-learning model. Example system 100 may also include a determining module 106 that determines a bias of a target message in the plurality of messages communicated from a target client device in the group with respect to a remaining number of the messages in the plurality of messages communicated from the other client devices in the group. Example system 100 may additionally include an assignment module 108 that assigns a confidence score to each of the other client devices based on the bias determined for the target message, the confidence score representing a likelihood of potentially malicious content in the target message. Example system 100 may also include a security module 110 that performs, based on the confidence score, a security action that prevents the potentially malicious content from compromising the update of the shared machine-learning model though illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting potentially malicious content in decentralized machine-learning model updates. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example data storage may store messages 122 (which may include a target message 124), a machine-learning model 126, and confidence scores 128.

Example system 100 in FIG. 1 may be implemented in a variety of ways. For example, all or a portion of example system 100 may represent portions of example system 200 in FIG. 2. As shown in FIG. 2, system 200 may include a server 202 in communication with a target client device 206, client device 208, and client device 210 via a network 204. In one example, all or a portion of the functionality of modules 102 may be performed by server 202 and/or any other suitable computing system. As will be described in greater detail below, one or more of modules 102 from FIG. 1 may, when executed by at least one processor of server 202, enable server 202 to detect potentially malicious content in decentralized machine-learning model updates.

For example, receiving module 104 may receive messages 122A-122C from target client device 206 and client devices 208 and 210. Each of messages 122A, 122B, and 122C may include message variables 214, 216, and 218, respectively. Next, determining module 106 may determine a target message bias 222. Then assignment module 106 may determine a confidence score 220. Finally, security module 108 may perform a security action that prevents potentially malicious content 224 from compromising updates of machine-learning model 126.

Server 202 generally represents any type or form of computing device capable of reading computer-executable instructions. For example, server 202 may be federated server for updating decentralized federated machine-learning models shared by a group of client devices. Additional examples of server 202 include, without limitation, security servers, application servers, web servers, storage servers, and/or database servers configured to run certain software applications and/or provide various security, web, storage, and/or database services. Although illustrated as a single entity in FIG. 2, server 202 may include and/or represent a plurality of servers that work and/or operate in conjunction with one another.

Target client device 206 and client devices 208 and 210 generally represent any type or form of computing device that is capable of reading computer-executable instructions. For example, target client device 206 and client devices 208 and 210 may represent federated client devices that collaborate to update a shared federated machine-learning model. Additional examples of target client device 206 and client devices 208 and 210 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between server 202 and target and client devices 206-210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for detecting potentially malicious content in decentralized machine-learning model updates. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a plurality of messages communicated within a group of client devices for performing an update of a shared machine-learning model. For example, receiving module 104 may, as part of server 202 in FIG. 2, receive messages 122A-122C communicated between target client device 206 and client devices 208 and 210 for performing an update of machine-learning model 126. Additionally, the messages 122A-122C may be combined into machine-learning model 126 over several plurality of iterations.

Receiving module 104 may receive messages 122A-122C in a variety of ways. For example, receiving module 104 may receive messages sent from client devices 208 and 210 to target client device 206 for calculating an update of target client device 206.

At step 304, one or more of the systems described herein may determine a bias of a target message in the plurality of messages communicated from a target client device in the group with respect to a remaining number of the messages in the plurality of messages communicated from the other client devices in the group. For example, determining module 106 may, as part of server 202 in FIG. 2, determine target message bias 222 of message 122A communicated from target client device 206.

The term "message bias," as used herein, generally refers to any message sent from a client computing device that has a disproportionate weight or influence with respect to updating a machine-learning model shared by other client computing devices in a device group or neighborhood. In some examples, the client computing devices may be federated client devices in the same group or neighborhood configured to communicate update messages for updating a shared machine-learning model. In this configuration, one or more of update messages sent from a target client may have a greater weight (e.g., "bias") on the shared machine-learning model than other messages sent from the other clients in the neighborhood.

Determining module 106 may determine target message bias 222 in a variety of ways. In some examples, determining module 106 may calculate a ratio of message variables 216 and 218 associated with messages 122B and 122C communicated from client devices 208 and 210, and message variables 214 associated with a message 122A communicated from target client device 206. Determining module 106 may then determine target message bias 222 based on a size of the calculated ratio. For example, determining module 106 may use the ratio $R\hat{}i\_\{j\}=|Median\_i-C\_\{j \rightarrow i\}|/(|Median\_i-C\_\{0 \rightarrow i\}|+|Median\_i-C\_\{1 \rightarrow i\}|+|Median\_i-C\_\{2 \rightarrow i\}|+|Median\_i-C\_\{3 \rightarrow i\}|+ \ldots +|Median\_i-C\_\{N \rightarrow i\}|)$ to measure the bias level of each message variable $C\_\{j \rightarrow i\}$ from the median of $\{C\_\{0 \rightarrow i\}, C\_\{1 \rightarrow i\}, \ldots, C\_\{N \rightarrow i\}\}$ (denoted as Median_i). The higher ratio $R\hat{}i\_j$ is, the more biased the message from the corresponding $M\hat{}i\_j$ is from the averaged agent (e.g., client device) update of M_i.

The term "message variable," as used herein, generally refers to any gradient or differential associated with a message utilized for updating a machine-learning model shared by client computing devices in a device group or neighborhood. For example, a message variable for a target client device may be a stochastic gradient-based update of a neighboring client device or a may be a weighted combination/non-linear transformation of the gradient-based update of multiple client devices.

At step 306, one or more of the systems described herein may assign a confidence score to each of the other client devices based on the bias determined for the target message, the confidence score representing a likelihood of potentially malicious content in the target message. For example, assignment module 108 may, as part of server 202 in FIG. 2, assign a confidence score 220 to client device 208 and client device 210 based on target message bias 222. In some examples, confidence score 220 may be a numerical value representing a likelihood of potentially malicious content in a message 122A.

Assignment module 108 may assign a confidence score 220 in a variety of ways. In some examples, assignment module 108 may determine, based on target message bias 222, that a message 122A represents a large deviation from messages 122B and 122C on client devices 208 and 210 for a current round of training. Additionally or alternatively, assignment module may determine that a message 122A represents a large deviation from shared machine-learning model 126 (e.g., a current aggregate model being trained). Then, assignment module 108 may assign a value (e.g., a confidence score 220) to client devices 208 and 210 indicating a high likelihood of potentially malicious content in a message 122A. Additionally or alternatively, assignment module may determine, based on target message bias 222, that a message 122A represents a small deviation from messages 122B and 122C for a current round of training. Additionally or alternatively, assignment module may determine that a message 122A represents a small deviation from shared machine-learning model 126 (e.g., a current aggregate model being trained). Assignment module 108 may then assign a value (e.g., a confidence score 220) to client devices 208 and 210 indicating a low likelihood of potentially malicious content in a message 122A. In some examples, a confidence score 220 may be an update of a previously determined confidence score for client devices 208 and 210. In some examples, assignment module 108 may assign a confidence score 220 by assigning a score $f(R\hat{}i\_j)$ to represent the confidence over a message sent from a neighboring client device $M\hat{}i\_j$. Subsequently, a variable f may be designated as a proper function mapping which may be defined as a sigmoid function as follows: $f(R\hat{}i\_j)=1/(1+\exp(R\hat{}i\_j))$. A finding of $f(R\hat{}i\_j)=1$ when $R\hat{}i\_j$ is approaching 0, indicates that a message output from $M\hat{}i\_j$ has a small deviance from the median and thus an output of $M\hat{}i\_j$ output is more likely to be a benign output (e.g., free from malicious content).

At step 308, one or more of the systems described herein may perform, based on the confidence score, a security action that prevents the potentially malicious content from compromising the update of the shared machine-learning model. For example, security module 110 may, as part of server 202 in FIG. 2, perform a security action that prevents potentially malicious content 224 from compromising (e.g., injecting poisoned data) the update of machine-learning model 126. Security module 110 may perform the security action in a variety of ways. For example security module 110 may perform a security action that minimizes an impact of potentially malicious content 224 by filtering potentially malicious content 224 from scheduled updates of machine-learning model 126. Thus, for example, a message 122A from target client device 206 may be filtered from an update of machine-learning model 126 while messages 122B and 122C from client devices 208 and 210 may be allowed.

FIG. 4 is a block diagram of an additional example system 400 for detecting malicious content in decentralized machine-learning model updates. In some examples, system 400 may include a trusted network 402. Trusted network 402 may include client devices 404, 406, and 408 configured to communicate (e.g., send and receive) messages for updating a shared machine-learning model 412. Additionally, each of client devices 404-410 may learn a custom/different machine-learning model based on trust relationships that may either be learned (e.g., based on bias) or predefined.

The term "trusted network," as used herein, generally refers to any network of computing devices having a predetermined trust relationship by virtue of being members of a group and/or sharing common attributes. For example, a trusted network may include computing systems utilized by large banking institutions for making financial transactions and which share common internal data.

System 400 may also include additional client devices 410 located outside of trusted network 402. In some examples, additional client devices 410 may belong to a limited-trust or untrusted network relative to trusted network 402 and be configured to communicate update messages to machine-learning model 412.

Figure 5:
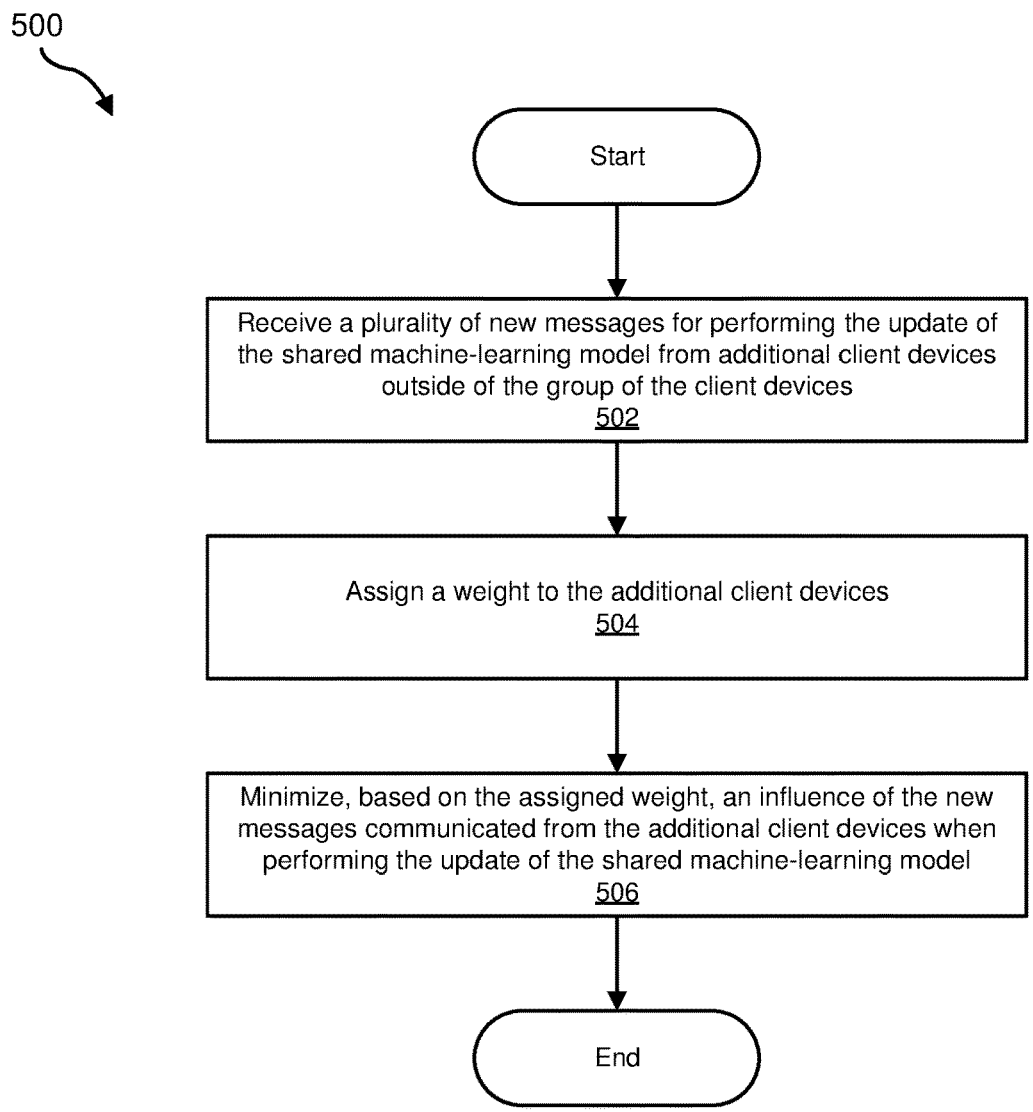
FIG. 5 is a flow diagram of another example method for detecting potentially malicious content in decentralized machine-learning model updates.

FIG. 5 is a flow diagram of an example computer-implemented method 500 for detecting potentially malicious content in decentralized machine-learning model updates. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 505 one or more of the systems described herein may receive a plurality of new messages for performing the update of the shared machine-learning model from additional client devices outside of the group of the client devices. For example, machine-learning model 412 may receive update messages communicated from additional client devices 410 outside of trusted network 402 including client devices 404, 406, and 4.

At step 510, one or more of the systems described herein may assign a weight to the additional client devices. For example, trusted network 402 may assign a weight to additional client devices 410 based on a level of trust (or lack thereof) determined for additional client devices 410 by trusted network 402. For example, if trusted network 402 determines that additional client devices 410 have a high level of trust with client devices 404-408, trusted network 402 may assign a high weight to update messages communicated from additional client devices 410 to machine-learning model 412. On the other hand, if trusted network 402 determines that additional client devices 410 have a low level (or lack) a level of trust with client devices 404-408 may assign a low weight to update messages communicated from additional client devices 410 to machine-learning model 412.

At step 515, one or more of the systems described herein may minimize, based on the assigned weight, an influence of the new messages communicated from the additional client devices when performing the update of the shared machine-learning model. For example, when additional client devices 112 have been assigned a low weight by trusted network 402, the influence of update messages sent from additional client devices 112 will be minimized when machine-learning model 412 is updated. For example, update messages received from additional client devices 410 may be ignored by machine-learning model 412 when a low weight has been assigned.

As explained in connection with method 300 above, the systems and methods described provide for detecting malicious content in decentralized federated machine-learning model updates. A threat detection application may be configured to determine a bias of a target message within a group of messages for updating a federated machine-learning model shared by a group or neighborhood of federated computing devices. The target message may be communicated from a target computing device in the group with respect to a remaining number of the messages in the group of messages communicated from the other computing devices in the group. The threat detection application may then be configured to assign a confidence score to each of the other computing devices in the group based on the bias determined for the target message. The confidence score may represent a likelihood of potentially malicious content in the target message. Based on the confidence score, potentially malicious content may be detected and subsequently prevented from compromising updates of the federated machine-learning model.

Figure 6:
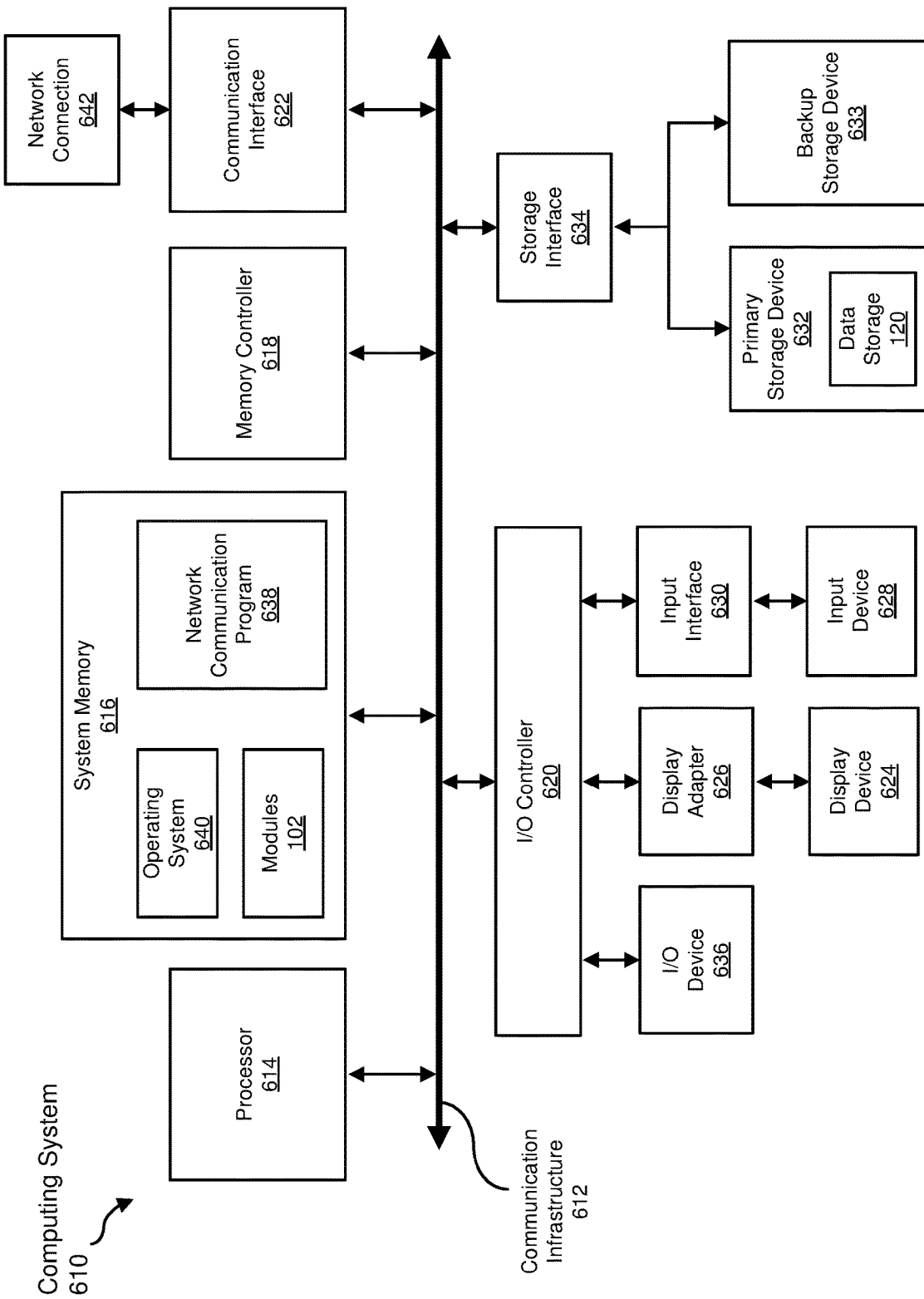
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
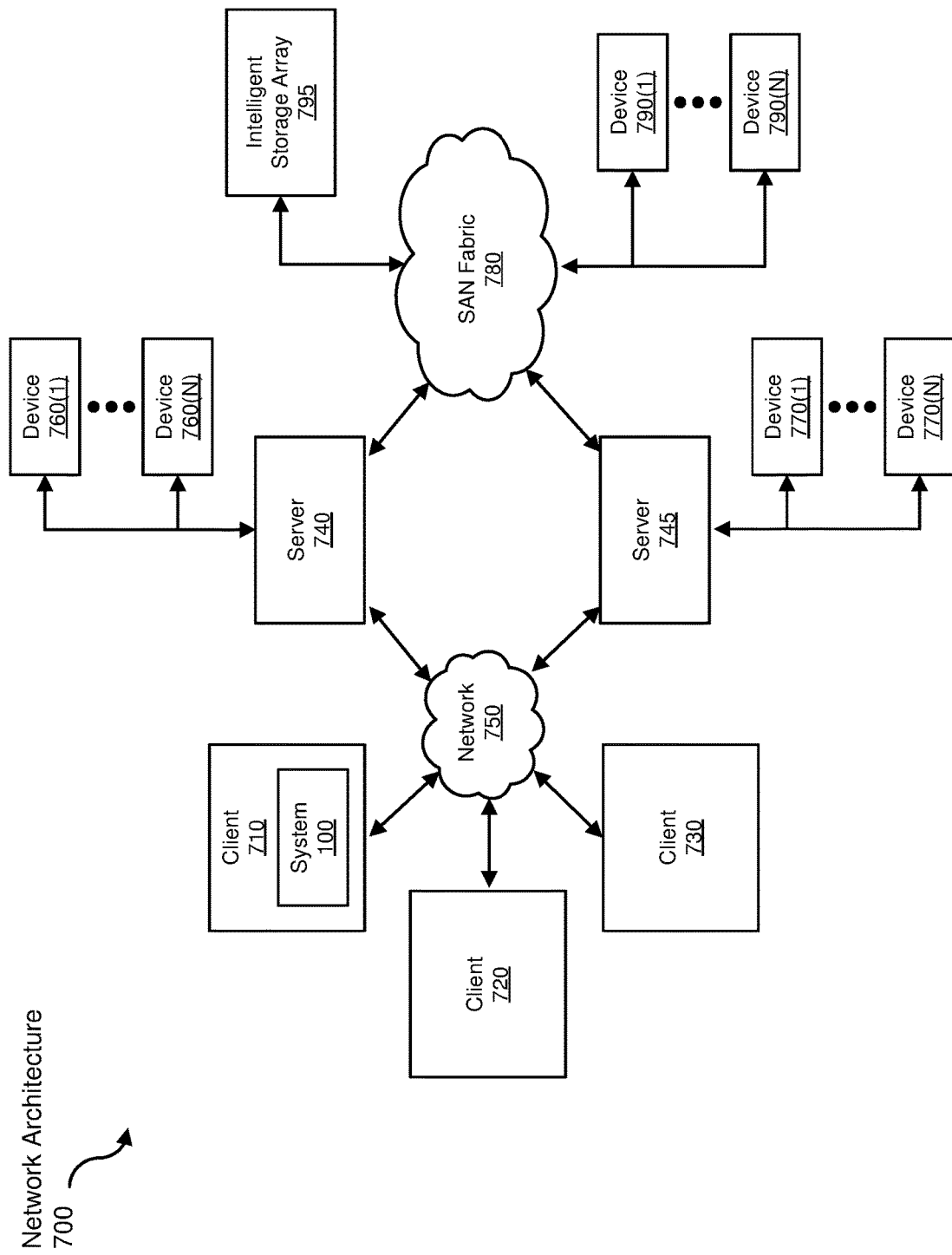
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting potentially malicious content in decentralized machine-learning model updates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially malicious content in decentralized machine-learning model updates, at least a portion of the method being performed by one or more computing devices comprising at least one processor, the method comprising:
   receiving, by the one or more computing devices, a plurality of messages communicated within a group of client devices for performing an update of a shared machine-learning model;
   determining, by the one or more computing devices, a bias of a target message in the plurality of messages communicated from a target client device in the group with respect to a remaining number of the messages in the plurality of messages communicated from the other client devices in the group;
   assigning, by the one or more computing devices, a confidence score to each of the other client devices based on the bias determined for the target message, the confidence score representing a likelihood of potentially malicious content in the target message; and
   performing, by the one or more computing devices and based on the confidence score, a security action that prevents the potentially malicious content from compromising the update of the shared machine-learning model.

2. The computer-implemented method of claim 1, further comprising:
   receiving a plurality of new messages for performing the update of the shared machine-learning model from additional client devices outside of the group of the client devices;
   assigning a weight to the additional client devices; and
   minimizing, based on the assigned weight, an influence of the new messages communicated from the additional client devices when performing the update of the shared machine-learning model.

3. The computer-implemented method of claim 2, wherein the plurality of messages communicated within the group of client devices and the new messages communicated from the additional client devices are combined into the shared-machine learning model over a plurality of iterations.

4. The computer-implemented method of claim 2, wherein the additional client devices have a trusted relationship level with the group of the client devices.

5. The computer-implemented method of claim 4, wherein a pre-determined trust relationship level shared by the group of the client devices exceeds the trusted relationship level of the additional client devices.

6. The computer-implemented method of claim 1, wherein determining the bias of the target message comprises:
   calculating a ratio of a plurality of message variables associated with the messages communicated from the other client devices and a plurality of message variables associated with the target message communicated from the target client device; and
   determining the bias of the target message based on a size of the calculated ratio.

7. The computer-implemented method of claim 1, wherein assigning the confidence score comprises:
   determining, based on the bias, that the target message represents a large deviation from at least one of:
   the remaining number of messages; or
   the shared machine-learning model; and
   assigning a value to the other client devices indicating a high likelihood of the potentially malicious content in the target message.

8. The computer-implemented method of claim 1, wherein assigning the confidence score comprises:
   determining, based on the bias, that the target message represents a small deviation from at least one of:
   the remaining number of messages; or
   the shared-machine learning model; and
   assigning a value to the other client devices indicating a low likelihood of the potentially malicious content in the target message.

9. The computer-implemented method of claim 1, wherein assigning the confidence score comprises updating a previously determined confidence score for each of the other client devices based on the bias determined for the target message.

10. The computer-implemented method of claim 1, wherein performing the security action comprises minimizing an impact of the potentially malicious content by filtering the potentially malicious content from the update of the shared machine-learning model.

11. The computer-implemented method of claim 1, wherein each of the client devices in the group share at least one of a learned and a pre-defined trust relationship and wherein, based on the trust relationships, each of the client devices learns a custom machine-learning model.

12. A system for detecting potentially malicious content in decentralized machine-learning model updates, the system comprising:
   at least one physical processor;
   physical memory comprising a plurality of modules and computer-executable instructions that, when executed by the physical processor, cause the physical processor to:
   receive, by a receiving module, a plurality of messages communicated within a group of client devices for performing an update of a shared machine-learning model;
   determine, by a determining module, a bias of a target message in the plurality of messages communicated from a target client device in the group with respect to a remaining number of the messages in the plurality of messages communicated from the other client devices in the group;
   assign, by an assignment module, a confidence score to each of the other client devices based on the bias determined for the target message, the confidence score representing a likelihood of potentially malicious content in the target message; and
   perform, by a security module and based on the confidence score, a security action that prevents the potentially malicious content from compromising the update of the shared machine-learning model.

13. The system of claim 12, wherein the assignment module:
- receives a plurality of new messages for performing the update of the shared machine-learning model from additional client devices outside of the group of the client devices;
- assigns a weight to the additional client devices; and
- minimizes, based on the assigned weight, an influence of the new messages communicated from the additional client devices when performing the update of the shared machine-learning model.

14. The system of claim 13, wherein the plurality of messages communicated within the group of client devices and the new messages communicated from the additional client devices are combined into the shared-machine learning model over a plurality of iterations.

15. The system of claim 13, wherein the additional client devices have a trusted relationship level with the group of the client devices.

16. The system of claim 15, wherein a pre-determined trust relationship level shared by the group of the client devices exceeds the trusted relationship level of the additional client devices.

17. The system of claim 12, wherein the determining module determines the bias of the target message by:
- calculating a ratio of a plurality of message variables associated with the messages communicated from the other client devices and a plurality of message variables associated with the target message communicated from the target client device; and
- determining the bias of the target message based on a size of the calculated ratio.

18. The system of claim 12, wherein the assignment module assigns the confidence score by:
- determining, based on the bias, that the target message represents a large deviation from at least one of:
  - the remaining number of messages; or
  - the shared-machine learning model; and
- assigning a value to the other client devices indicating a high likelihood of the potentially malicious content in the target message.

19. The system of claim 12, wherein the assignment module assigns the confidence score by:
- determining, based on the bias, that the target message represents a small deviation from at least one of:
  - the remaining number of messages; or
  - the shared machine-learning model; and
- assigning a value to the other client devices indicating a low likelihood of the potentially malicious content in the target message.

20. A non-transitory computer-readable medium comprising one or more computer-executable instructions that, when executed by at least one processor of a computing device, cause the computing device to:
- receive a plurality of messages communicated within a group of client devices for performing an update of a shared machine-learning model;
- determine a bias of a target message in the plurality of messages communicated from a target client device in the group with respect to a remaining number of the messages in the plurality of messages communicated from the other client devices in the group;
- assign a confidence score to each of the other client devices based on the bias determined for the target message, the confidence score representing a likelihood of potentially malicious content in the target message; and
- perform, based on the confidence score, a security action that prevents the potentially malicious content from compromising the update of the shared machine-learning model.

* * * * *